United States Patent [19]

Urbanczyk

[11] 4,306,686

[45] Dec. 22, 1981

[54] COMPOST TREATMENT APPARATUS

[75] Inventor: Marvin L. Urbanczyk, White Deer, Tex.

[73] Assignee: Scarab Manufacturing and Leasing, Inc., White Deer, Tex.

[21] Appl. No.: 98,351

[22] Filed: Nov. 27, 1979

[51] Int. Cl.³ .............................................. B02C 19/12
[52] U.S. Cl. ................................ 241/101.7; 180/140; 241/30
[58] Field of Search .......................... 280/99; 180/140; 241/30, 101.7, 27, 189 R, 285 R, DIG. 38; 366/345

[56] References Cited

U.S. PATENT DOCUMENTS

| | | | |
|---|---|---|---|
| 3,059,403 | 10/1962 | Bamford et al. | 241/101.7 UX |
| 3,087,564 | 4/1963 | Quayle | 180/140 |
| 3,664,645 | 5/1972 | Cobey | 241/101.7 |
| 4,019,723 | 4/1977 | Urbanczyk | 241/101.7 |

Primary Examiner—Mark Rosenbaum
Attorney, Agent, or Firm—Brady, O'Boyle & Gates

[57] ABSTRACT

A machine and method are disclosed whereby a deep continuous layer of waste material in a large field can be processed into compost without prearranging the material in windrows. Up to four times as much material in a given area can be treated compared to windrowed material. The machine forms an initial pathway through the deep layer of material by following one boundary of the material with the material treating mechanism and supporting tunnel frame set at an oblique angle to the pathway and the tracking wheels set at acute angles to the tunnel axis. The material undergoing treatment is continuously discharged rearwardly at an oblique angle. At the end of the initial pathway, the machine is turned and adjusted to a second operational mode and moved in a reverse direction along a second pathway contiguous with the initial pathway. The material along the second pathway is treated and continuously discharged rearwardly at an oblique angle into the initial pathway to fill in the same. The method is continued until the entire continuous layer of material is treated without disturbing its continuity.

11 Claims, 16 Drawing Figures

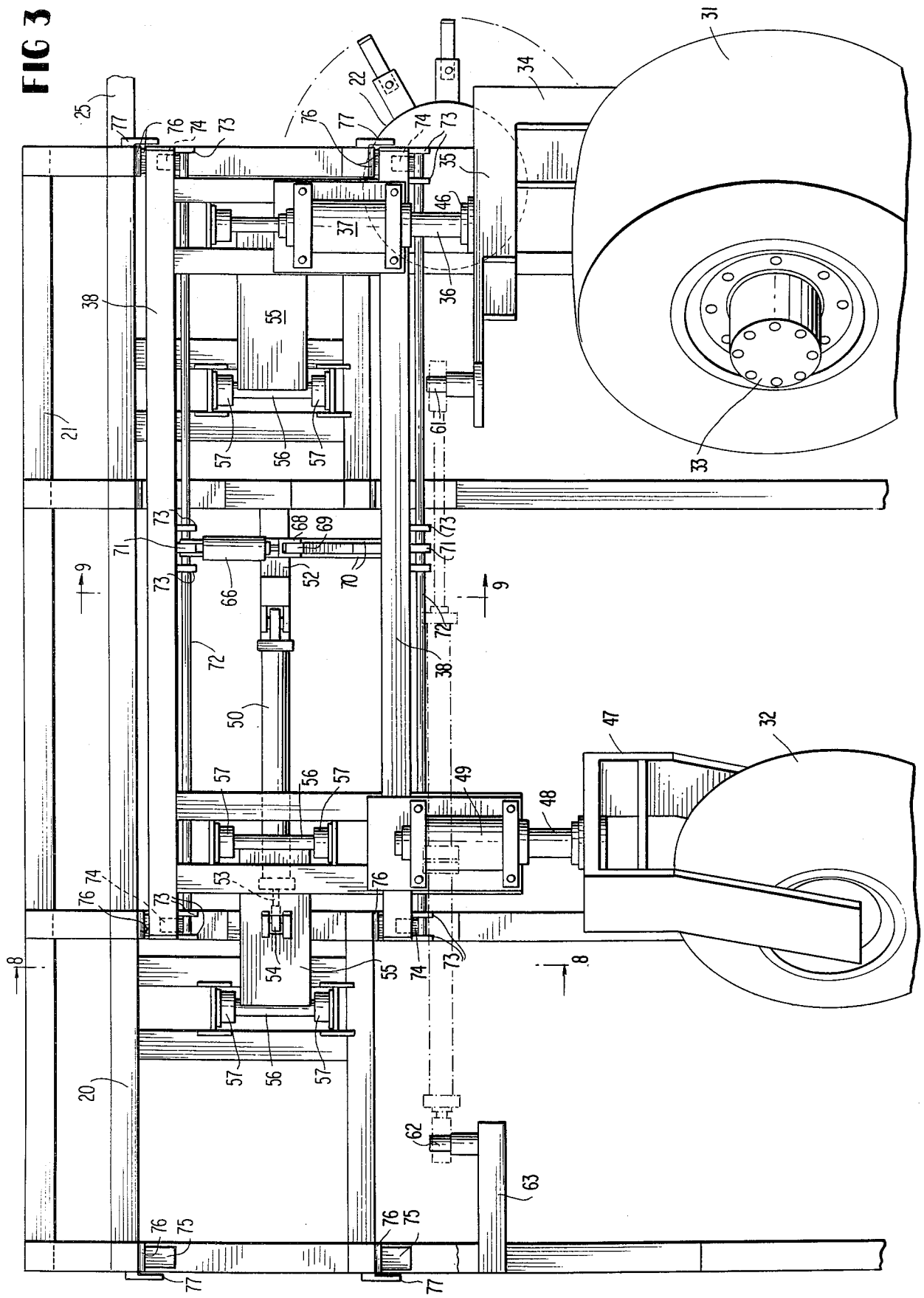

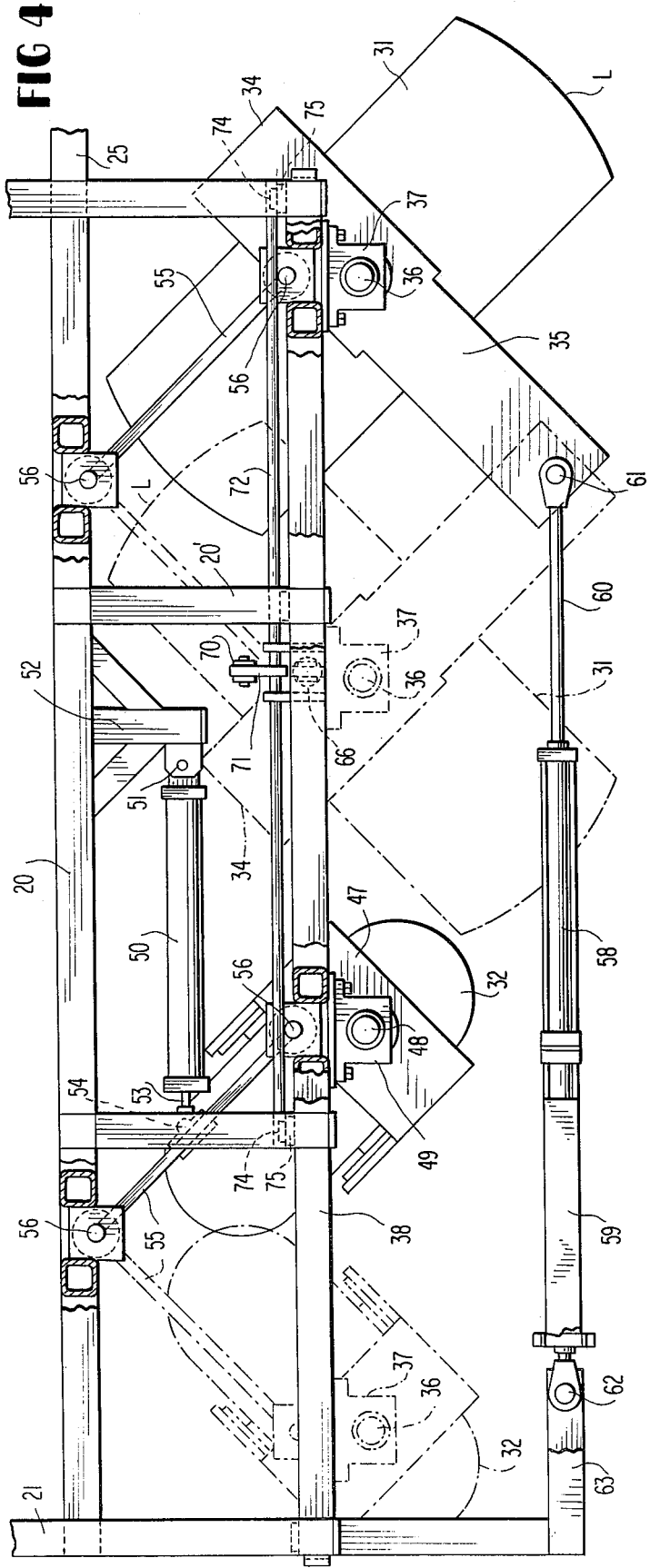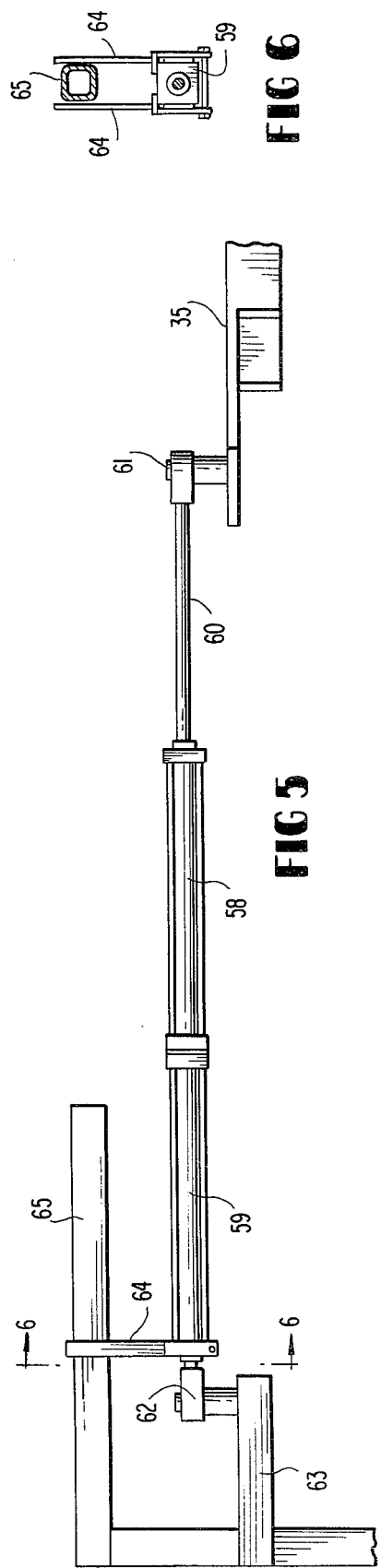

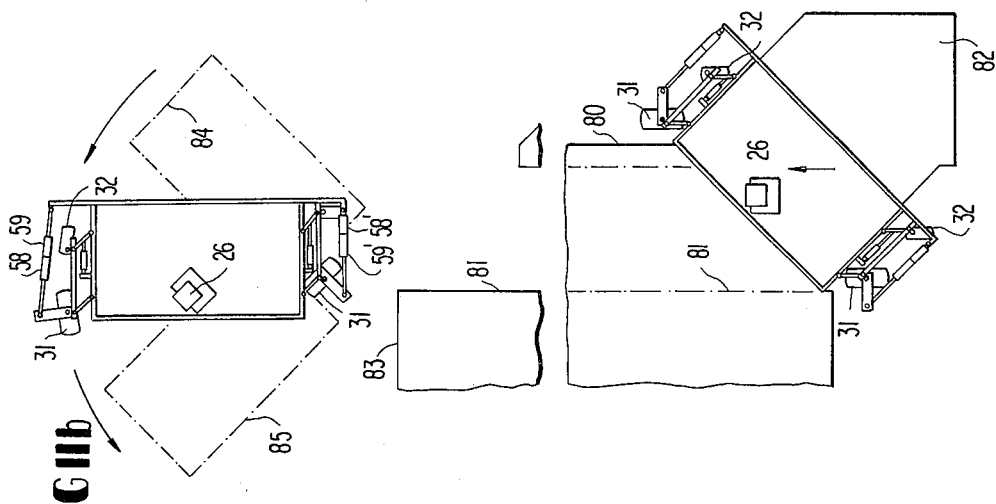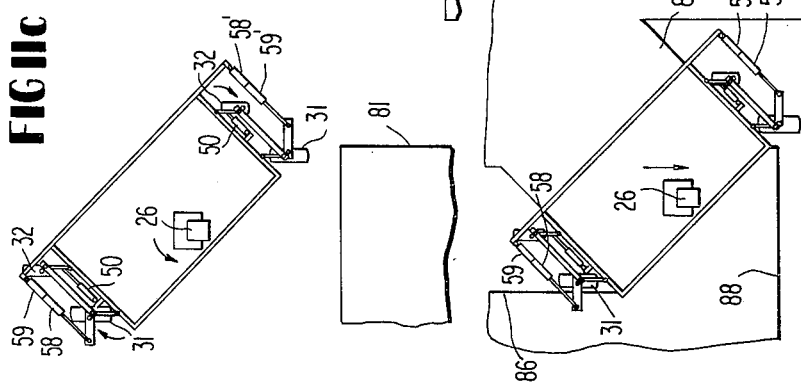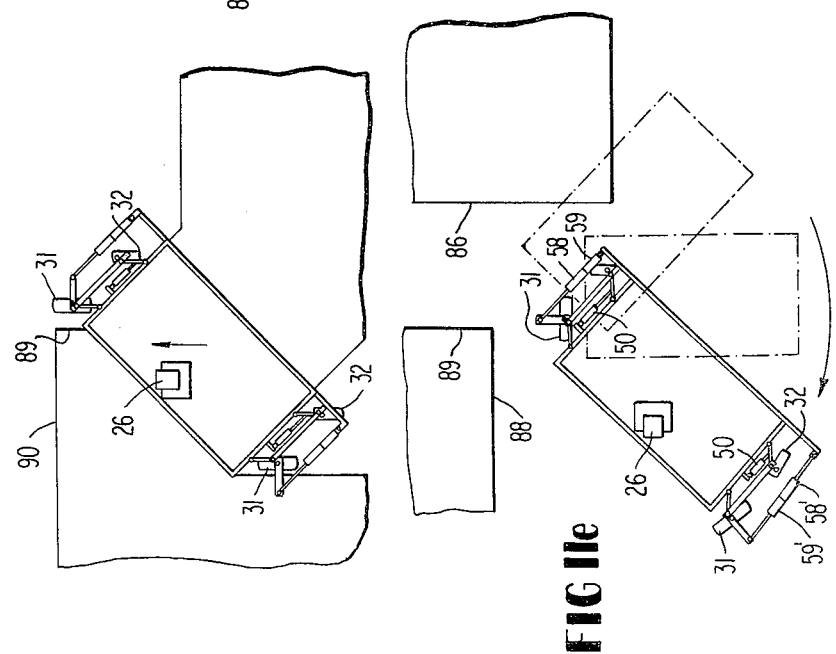

4,306,686

COMPOST TREATMENT APPARATUS

BACKGROUND OF THE INVENTION

In the formation of compost, it is customary to arrange waste material, such as sludge from sewage treatment plants or partly decayed vegetation, in well defined windrows on a large field and to mechanically treat the waste material in each windrow by moving a straddle type machine along the windrow with the wheels of the machine rolling on solid ground on opposite sides of the windrow. A tunnel frame of the machine having its tunnel axis parallel to the windrow axis carries beating, chopping or other agitating means to churn and turn over the waste material while the machine traverses each windrow. A typical prior art machine of this character is shown in U.S. Pat. No. 4,019,723.

In accordance with this invention, a new and more efficient waste material treatment method and apparatus are provided, and up to four times as much material can be treated in accordance with the invention in a given space in comparison to the prior art with an obvious great economic advantage. The necessity for windrowing the material prior to its mechanical treatment is entirely eliminated.

By the present method, continuous deep layers of waste material, up to six or eight feet in depth extending over wide areas, are treated in a continuing process without disturbing the continuity of the material mass or layer.

The machine employed to practice the method includes a tunnel frame carrying within it the appropriate waste material mechanical working or treatment elements and the tunnel frame is set at an oblique angle to the pathway which the machine carves or forms for itself through the deep material layer in a number of forward and reverse passes. The wheels of the machine which establish the direction of the pathway are held at acute angles to the tunnel axis of the machine tunnel frame. The machine is operated in two distinct modes, namely, a right and left hand mode, and includes power steering means and additional power means to quickly change the machine from right to left hand operational mode to releasably lock it in either mode. In both operational modes, the machine's tracking wheels are maintained at acute angles to said tunnel axis. By initially attacking the deep layer of waste material along a boundary or margin thereof and following in the pathway which the machine clears for itself through the material, the wheels of the machine are enabled to run on solid ground at all times in spite of the great depth of the waste material layer and the absence of windrows. When moving on subsequent pathways through the material, the tracking wheels follow previously-cleared pathways through the material while simultaneously following in the new pathway being cleared by the machine. The material treatment takes place continuously and the worked material is discharged by the machine to the rear at an oblique angle into the preceding pathway to refill the same and maintain the continuity of the waste material layer.

BRIEF DESCRIPTION OF THE DRAWINGS

FIG. 3 is a further elevational view of the machine taken along the FIG. 3 direction arrow in FIG. 1.

FIG. 4 is a fragmentary plan view of the machine, partly in section, and showing particularly operational mode changing and steering components.

FIG. 5 is a fragmentary side elevation of the components in FIG. 4.

FIG. 6 is a vertical section taken on line 6—6 of FIG. 5.

FIGS. 11a through 11f are diagrammatic plan views of the machine depicting its operation in the practice of the method.

DETAILED DESCRIPTION

Figure 2:
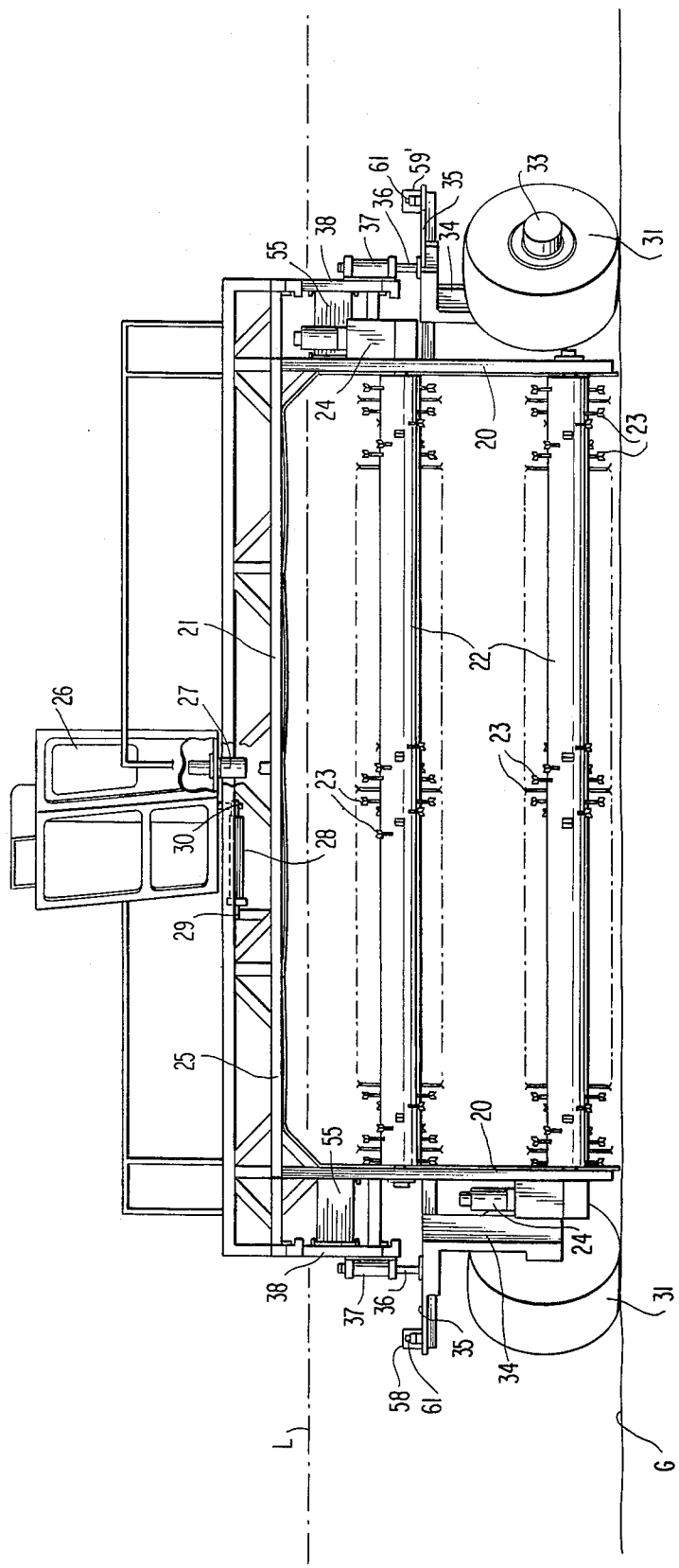
FIG. 2 is an elevational view of the machine taken along the FIG. 2 directional arrow in FIG. 1.

Referring to the drawings in detail wherein like numerals designate like parts, a compost treatment machine comprises a tunnel frame or body portion defined by side vertical frame sections 20 and a top horizontal frame section 21 rigidly joined thereto. Within the tunnel formed by this frame is a pair of vertically spaced parallel transverse axis mechanicl treatment rotors 22, each carrying a multiplicity of material working elements 23 distributed over its periphery in a desired pattern. These working elements can be flails, blades or other fixed or pivoted material agitating and/or disintegrating elements, depending on the exact nature of the waste material to be processed. As best shown in FIG. 2, one rotor 22 operates near and above ground level while the second rotor is spaced substantially above the lower one so as to define a substantial passage between the two rotors. The two rotors are driven independently by gear motors 24 or the like mounted on tunnel frame sides 20. The rotors 22 may be driven in the same directions or oppositely and at the same or different speeds of rotation depending on the type of material undergoing treatment and other variables.

At its leading end, the tunnel frame top section 21 carries a forwardly projecting fender 25 to prevent churned-up powdery waste material from being thrown up over the top of the machine as the machine works its way through the material in a solid field of material.

At its top and approximate transverse center, the tunnel frame of the machine mounts an operator's cab 26 having a pivot axis 27. A horizontal cab swing cylinder 28 is connected between a rigid arm 29 on the machine frame and a cab crank pin 30 eccentrically located relative to the pivot 27. This arrangement allows the operator's cab to be rotated through ninety degrees at proper times to maintain a forward viewing position for the operator when the machine turns and reverses its path of movement through the waste material. This operation will be further described.

In FIG. 2, ground level is indicated at G and the top surface of a six to eight foot deep waste material layer is indicated at L. While the dimensions of the machine may vary, a practical embodiment thereof would include a tunnel frame measuring about twenty-four and one-half feet inside width by about ten feet inside height above ground level. The machine is capable of acting on a solid or continuous layer of waste material spanning a large area, regardless of the shape of the material layer whether rectangular, circular or irregular in shape. While carving its way through the deep layer of material, the machine continuously works or treats the material by means of its rotors 22 and continuously discharges the mechanically treated material rearwardly of the machine on a path at an oblique angle with the line of movement of the machine.

In accomplishing the above, as will now be described, the machine operates in two distinct modes, namely, right and left hand modes. The right hand mode of operation has been illustrated in drawing FIGS. 1 through 6 and 8 through 10, FIG. 7 showing a transition condition midway between the right and left hand modes.

More particularly, the described tunnel frame of the machine is transported on a pair of leading combination traction and steering wheels 31 and coacting trailing somewhat smaller caster wheels 32. It should be noted that in both the right and left hand operating modes of the machine these wheels normally track a path at acute angles to the tunnel axis of the machine defined by its tunnel frame, and the tunnel axis is at an oblique angle to the path of travel of the machine and the pathway it is clearing through the material, FIG. 1. The wheels 31 are driven by attached hydraulic wheel motors 33, the wheels and their motors being held on half-yokes 34 having upper steering arms 35 which are attached to vertically extensible and retractable rods 36 of double-acting raising and lowering cylinders 37 for the wheels 31. The cylinders 37 are attached to outboard frame members 38 forming parts of parallelogram linkages on opposite sides of the machine operable for changing the machine from right to left hand operating mode.

Figure 10:
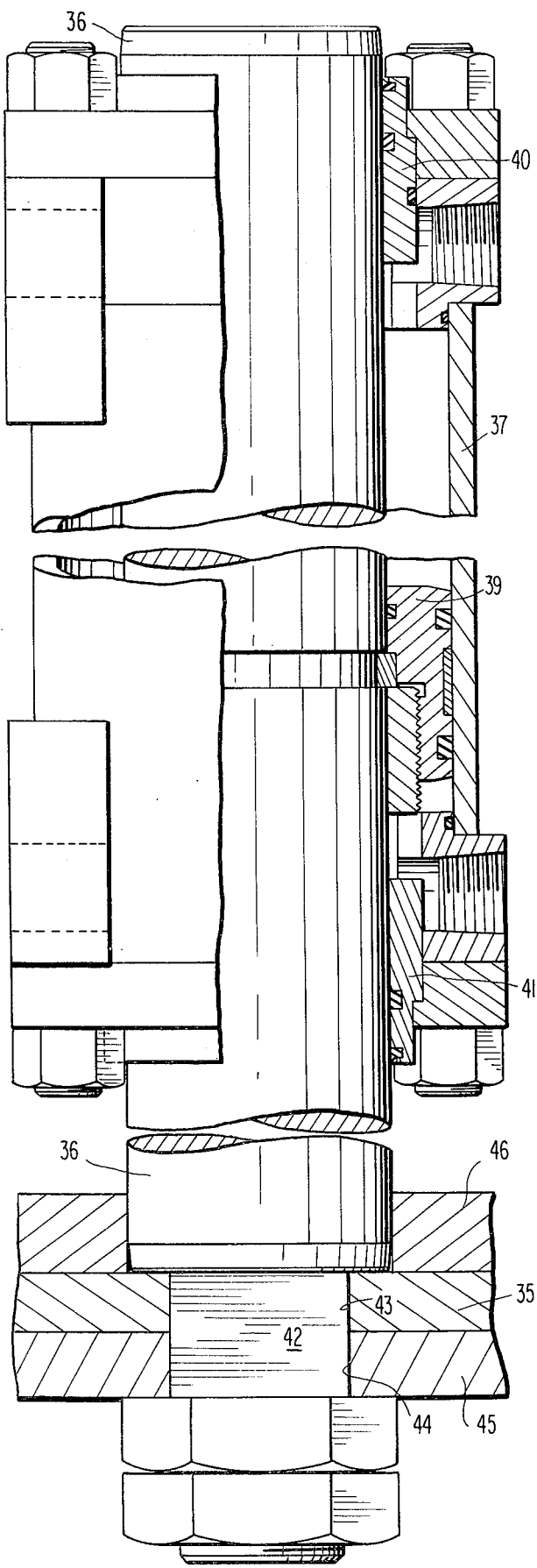
FIG. 10 is an enlarged central vertical section, partly broken away and partly in elevation, showing a double-acting wheel retracting and extending cylinder device.

Each upright cylinder 37 includes a rod attached piston head 39, FIG. 10, operating between sealed guide sleeves 40 and 41 for the piston rod 36 which can extend beyond the opposite ends of the cylinder 37. Each rod 36 at its lower end has a square extension 42 received in a square aperture 43 of steering arm 35 and in a registering square aperture 44 of a reinforcing collar 45 beneath and fixed to the arm 35. The rod 36 also carries a reinforcing collar 46 fixed thereto above arm 35. When the machine is steered in a manner to be described, each wheel 31 rotates with the associated rod 36 about the vertical axis of the associated wheel raising and lowering cylinder 37.

Similarly, each caster wheel 32 is journaled on a supporting yoke 47 to which is attached a vertical rod 48 of a cylinder 49 which is fixed to the adjacent parallelogram member 38. The cylinders 49 are double-acting and similar in construction and operation to the cylinders 37. At proper times, the cylinders 49 are used to raise and lower caster wheels 32 to facilitate changing the machine from one operating mode to the other. It may be mentioned here that the several coordinated operations of the machine are under control of an operator in the cab 26 who uses state of the art push button controls which, per se, are not a part of this invention and need not be shown and described for a proper understanding of the invention. The caster wheels 32 can swivel freely around the vertical axes of their raising and lowering cylinders 49.

Figure 1:
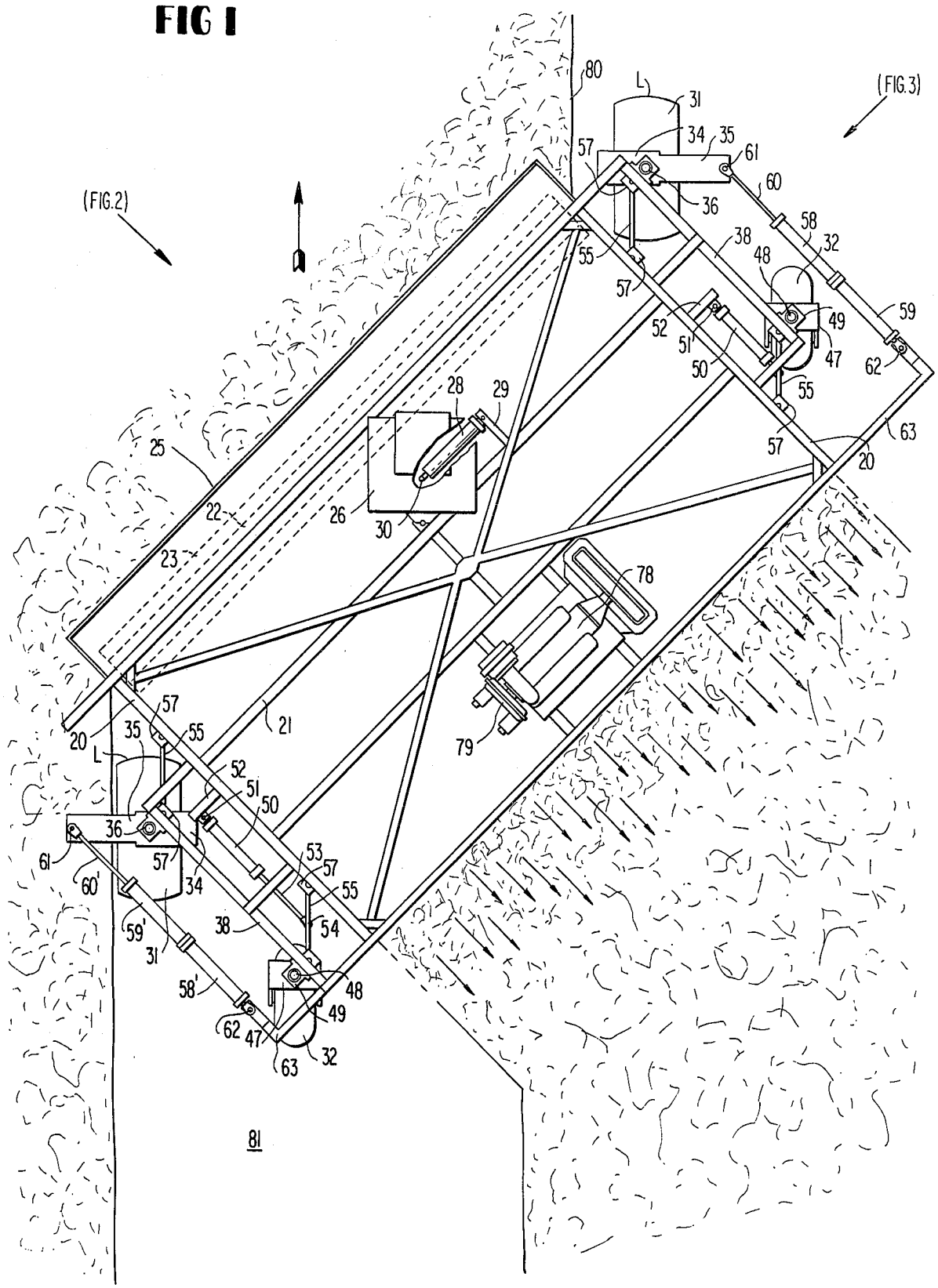
FIG. 1 is a plan view of a compost treatment machine according to the invention in one operational mode and making an initial pass through a continuous layer of waste material along one marginal edge thereof.

On each side of the machine, FIG. 1, a mode change cylinder 50 parallel to the tunnel axis is attached at 51 to a rigid frame arm 52. The rod 53 of each mode change cylinder is pivoted at 54 to a parallelogram link or plate 55. The parallelogram plates 55 can swing horizontally forwardly or rearwardly under influence of the two mode change cylinders 50. Their interior ends are pivotally attached to tunnel frame sides 20 and their outer ends are pivotally attached to longitudinal parallelogram members 38. Each parallelogram plate 55 has a vertical pivot shaft 56 fixed to each end thereof and the ends of each shaft 56 are held in bearings 57 attached, respectively, to tunnel frame sides 20 and parallelogram members 38. Thus, each parallelogram linkage embodies one tunnel frame side 20, one longitudinally shiftable member 38, and one pair of plates 55 under control of one cylinder 50.

Associated with the above-described mechanism is a power steering means for the machine. This means comprises, on each side of the machine and outwardly of the parallelogram linkages and mode change cylinders 50, a pair of back-to-back connected independently operable coaxial steering cylinders 58, 58', 59 and 59'. The cylinders 58 and 58' are left hand mode steering cylinders and the cylinders 59 and 59' are right hand mode steering cylinders. The rods 60 and 60' of cylinders 58 and 59' are pivotally attached at 61 near the ends of steering arms 35, while the far ends of cylinders 59 and 58' are pivotally attached at 62 to laterally projecting rigid frame bars 63 of the machine. These latter bars 63 are integral parts of the rigid tunnel frame of the machine. The steering cylinders are at an elevation below mode change cylinders 50 and parallel with the latter when the machine is in the right hand or left hand mode of use. As shown in FIGS. 5 and 6, a pair of guide arms 64 rising from cylinders 59 and 58' straddle the overhead frame bar 65 to prevent the steering cylinders from rotating on their longitudinal axes and thus twisting or fouling their attached hydraulic hoses.

In changing from right hand to left hand mode, the vertical cylinders 37 and 49 are operated to raise the wheels 31 and 32. As this occurs, the machine becomes supported on the ground by the bottoms of tunnel frame sides 20. The steering cylinder assemblies 58-59 and 58'-59' now form rigid links during the transition from right hand to left hand mode under influence of mode change cylinders 50. Referring to FIGS. 1 and 4, mode change cylinder 50 for the forward traction wheel 31 of the machine has its rod 53 extended while the rod of the other mode change cylinder 50 controlling rearward traction wheel 31 is retracted. As this occurs, parallelogram plates 55, FIG. 4, will swing clockwise on their pivots 56 connected to tunnel frame sides 20 and will move from the full line positions to the dotted line positions. Simultaneously, the associated parallelogram member 38 will be shifted on an arc with the plates 55 while remaining parallel to the tunnel axis of the machine to the left hand mode position. In doing this, the parts pass through and beyond the transition position of FIG. 7 where the plates 55 are at right angles to frame sides 20 and parallelogram members 38.

While the above is taking place, the steering arms 35 will be swung counterclockwise on pivots 61 and will move to the left hand mode positions shown in broken lines in FIG. 4, perpendicular to the previous right hand mode positions shown in full lines. As this compound motion occurs in changing from right to left hand mode, the leading edge L of each traction wheel 31 will swing around the vertical axis of cylinder rod 36 ninety degrees from the full line to the dotted line position in FIG. 4.

Figure 7:
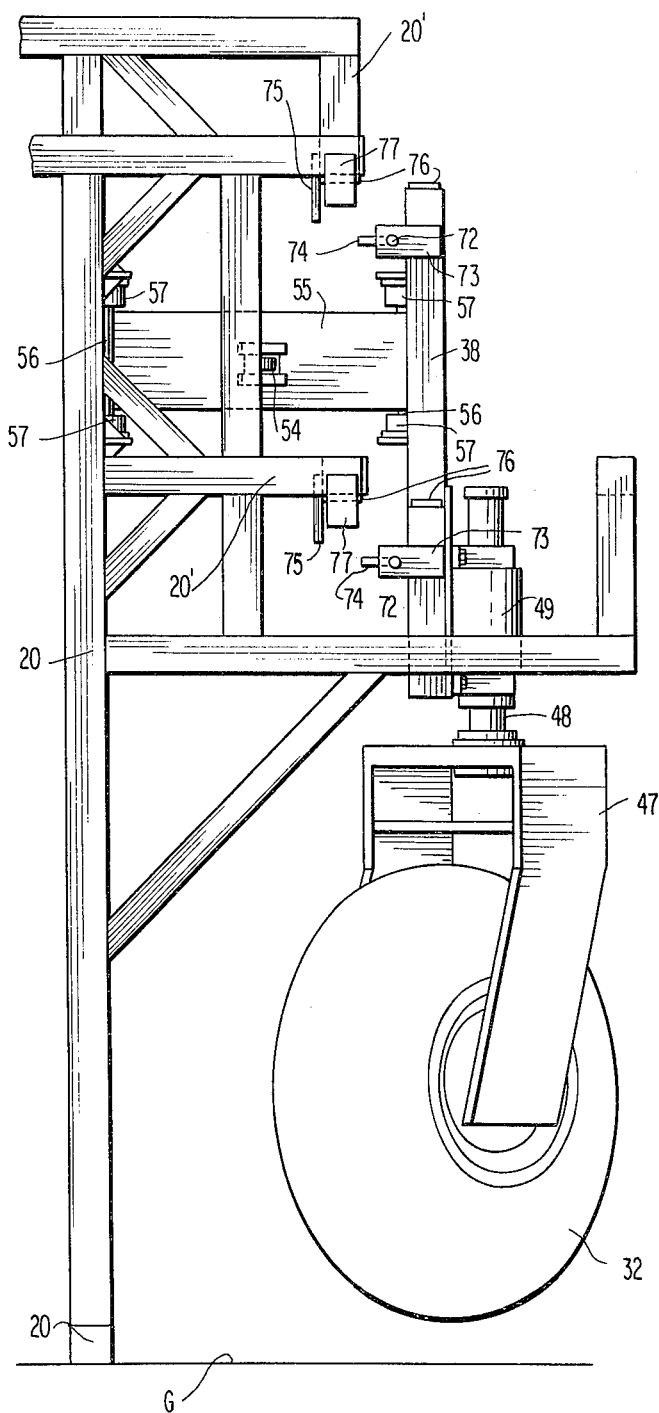
FIG. 7 is a fragmentary elevational view of the machine with the wheels thereof retracted during the process of changing from a first to a second operational mode.

FIG. 7 shows the parallelogram linkage at the center of its transition from right to left hand mode. The wheels of the machine have been raised from the ground and the machine is now resting on tunnel frame sides 20. The parallelogram plates 55 in FIG. 7 extend at right angles to frame sides 20 and members 38 in contrast to the normal forty-five degree disposition of these plates in both the right and left hand use modes. In the changing of the machine from right to left hand use mode by operation of cylinders 50, the caster wheels 32 while elevated from the ground are also bodily shifted through ninety degrees as indicated in FIG. 4. However, at all times, these caster wheels are freely swiveled on the axes of their raising and lowering rods 48 and are not restrained by the steering cylinder assemblies as described in relation to the wheels 31.

The invention includes means to positively and safely lock the machine in the right and left hand modes of use and to release the parallelogram mechanisms only at the proper times for changing from one use mode to the other. The locking means comprises a vertical axis locking cylinder 66 at each side of the machine having its top cylinder end coupled at 67 to parallelogram frame member 38 and its lower rod end coupled at 68 to a rigid arm 69 of a swing link 70 having its opposite ends pivotally attached to crank links 71, in turn attached to rotary locking shafts 72 journaled in bearing plates 73 on parallelogram frame member 38, FIG. 9.

Figure 8:
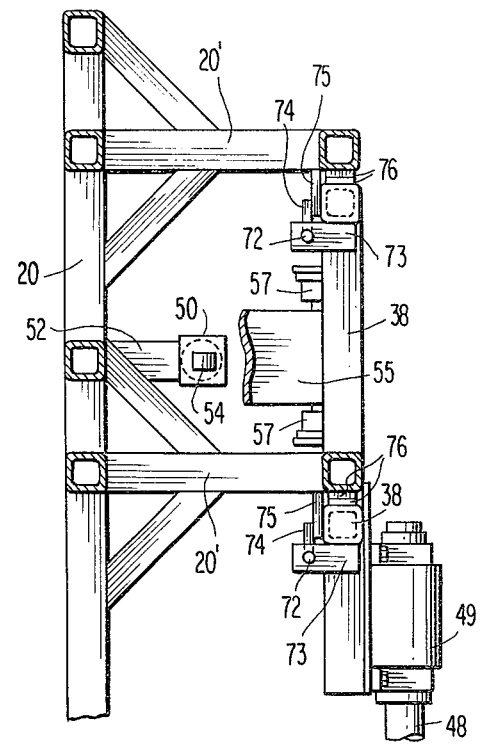
FIG. 8 is a fragmentary vertical section taken on line 8—8 of FIG. 3.
Figure 9:
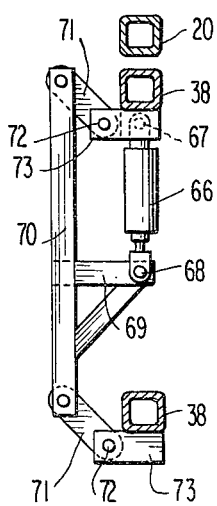
FIG. 9 is a similar view taken on line 9—9 of FIG. 3.

At their opposite ends, rotary locking shafts 72 have attached rotary locking plates 74, adapted to swing in unison behind coacting fixed depending locking plates 75 on lateral extensions 20' of tunnel frame sides 20. When the locking mechanism is active, FIG. 8, opposing bearing pads 76 on stationary and moving frame parts 20' and 38 slide into engagement to stabilize the machine in either the right hand or left hand use mode. As shown in FIG. 7, the bearing pads 76 are separated during the transition of the mechanism from one mode to the other. At this time, the rotary locking plates 74 are separated from the fixed plates 75 and extend at right angles thereto. The locking positions of the plates 74 and 75 shown in FIG. 8 prevail when locking cylinders 66 have their rods retracted as in FIG. 9 to thereby elevate the swing links 70 and crank links 71 for turning the shafts 72 and rotary plates 74 clockwise into parallel abutment with the backs of fixed plates 75. Extending the rods of cylinders 66 will turn the plates 74 counterclockwise, FIG. 8, to unlock the parallelogram linkages. Guide plates 77, FIGS. 3 and 7, are also preferably provided to stabilize the parallelogram linkages in either locked position. In either use mode of the machine, the inner sides of parallelogram members 38, FIG. 8, are held in abutment with fixed locking plates 75.

As shown in FIG. 1, a suitable engine 78 is mounted on top of the tunnel frame of the machine at a convenient location relative to cab 26 and drives associated pumping means 79 to power the wheel motors 33 and the various fluid pressure operated cylinders of the machine which have already been described.

OPERATION

The operation of the machine in the practice of the method can best be understood by referring to diagrammatic FIGS. 11a through 11f, keeping in mind that the machine is attacking a very deep layer of continuous unwindrowed waste material, such as sludge, spread over an area many times wider than the total traverse width of the machine.

Assuming that a large roughly rectangular field or layer of material requires treatment, the beginning position of the machine at the start of the method is shown in FIG. 11a. This position corresponds to FIG. 1 except that in FIG. 1 the machine has already advanced some distance along one edge or boundary 80 of the waste material layer, whereas in FIG. 11a the machine is just beginning to attack one corner of the field or layer, such as the southeast corner in the drawing illustration. In FIGS. 1 and 11a, the numeral 81 designates a first pathway which the composting machine is cutting for itself through the deep layer of waste material during a first pass in the northward direction while following the east edge 80 of the layer. At this time, the machine is locked in the right hand mode with the tunnel frame of the machine disposed at an oblique angle to the pathway 81. As best shown in FIG. 1, the wheels of the machine are at an acute angle to the tunnel axis of the machine frame, and this situation prevails in either use mode, as previously described. At all times, the trailing caster wheels 32 will automatically follow the positively steered wheels 31. In FIG. 11a, the operator's cab 26 faces forwardly with relation to the initial path of movement of the machine.

As the machine moves forwardly on its first pass through the waste material, its treatment rotors 22 continually beat up, agitate and turn over the material in a manner well known in the art and continually discharge the thoroughly treated material rearwardly at an oblique angle to the pathway 81. In relation to the entire rectangular field of waste material, the material being taken from the pathway 81 is being displaced in a southeasterly direction to a new position 82.

Progressing to FIG. 11b, the pathway 81 has been formed through the north boundary 83 of the material and the machine is now outside of the material mass and therefore able to turn or maneuver. When first emerging from the pathway 81, the machine is still locked in the right hand use mode, as shown at 84 in FIG. 11b. While in this mode, a ninety degree left hand turn of the machine to position 85 is executed by extending the rod of steering cylinder 59, all other steering cylinders of the machine remaining in their positions shown in FIGS. 1 and 11a. This causes the leading wheel 31 to turn to a position perpendicular to a radius centered on the rearward wheel 31 which wheel now forms a stationary pivot point for the turning machine while the forward wheel 31 follows a circular arc for ninety degrees, as shown by the arrows in FIG. 11b. The machine is still locked in the right hand use mode during this turning maneuver and the trailing caster wheel 32 tracks behind the leading traction wheel 31.

Progressing to FIG. 11c, the machine while in the position shown at 85 is now switched to left hand mode by operation of mode change cylinders 50 in the manner previously described with all of the wheels elevated and the lower edges of the machine tunnel frame resting on the ground. In FIG. 11c, the rod of steering cylinder 59 is retracted and locking cylinders 66 are operated to lock the machine in the left hand mode, such cylinders having previously been operated to unlock the associated parallelogram linkages to permit the adjustment from right to left hand mode, as above described. Cab rotating cylinder 28 is now used to rotate the cab 26 ninety degrees counterclockwise to a new forward facing position. This may be done simultaneously with the operation of mode change cylinders 50. The machine wheels 31 and 32 are re-lowered. It will now be necessary to maneuver the machine somewhat by means of steering cylinders 58-59 and 58'-59' to align the new leading traction wheel 31, FIG. 11c, with the new north-to-south edge of the material created by the formation of the first pathway 81.

With this accomplished, the machine begins to move on a first reverse or southward pass, FIG. 11d, while in the left hand operating mode, and in so doing, begins to cut a second pathway 86 through the field of waste material parallel and contiguous to the initial pathway 81. While this takes place, the adjustable speed rotors 22 treat the material and discharge it rearwardly at an oblique angle in a northeastward direction, as shown at 87, FIG. 11d. The discharged material is continually delivered into the first pathway 81 as the machine progresses southward substantially filling in this pathway to re-establish the continuity of the compost layer as the treatment of the material continues.

Upon cutting through the south border 88 of the field of waste material, the machine is again outside of the material, FIG. 11e, and free to maneuver. The machine is still locked in the left hand mode. As shown in FIG. 11e, a right hand or clockwise ninety degree turn is executed by extending the rod of steering cylinder 58', the machine then pivoting around the rear wheel 31 and following the arcuate path shown by the arrow to the full line position as shown. While in the full line position shown in FIG. 11e, the machine is now switched from left hand mode to right hand mode. The bottoms of the tunnel frame sides 20 are lowered to the ground and the wheels 31 and 32 are raised off the ground by operation of the vertical cylinders 37 and 49. The rod of steering cylinder 58' is retracted and locking cylinders 66 are operated to unlock the associated parallelogram linkages. Mode change cylinders 50 are actuated in the manner previously described to switch the machine from left hand mode to right hand mode by shifting the right hand parallelogram linkage from the extreme rear position and the left hand parallelogram linkage from the extreme forward position as shown in FIG. 11e, respectively to the extreme forward position and the extreme rear position, as shown in FIG. 11f and FIG. 11a. Simultaneously, the operator's cab 26 is again turned ninety degrees clockwise by operation of cylinder 28, to again face the forward movement path of the machine. The locking cylinders 66 are again actuated to lock the parallelogram linkages in the right hand mode position, and the vertical cylinders 37 and 49 are operated to lower the wheels 31 and 32 and thus raise the tunnel frame off of the ground. After some alignment maneuvering by use of the steering cylinders, the machine can again move in a northward or reverse direction following the newly formed east edge 89 of the material created when the pathway 86 was being formed. It should be mentioned that to minimize the required number of ninety degree turns and attendant maneuvers of the machine, it is best to operate the machine in the direction of the longest dimension of a rectangular field of waste material.

In moving again northward, FIG. 11f, a new strip of waste material is mechanically treated, and this material is discharged rearwardly at an oblique angle to the path of movement of the machine and into the pathway 86 to fill up the same and again maintain the continuity of the deep layer of material. The described north and south traverses of the machine through the material while locked alternately in the right and left hand mode are repeated until the entire continuous layer of material has been treated in the described manner without any windrowing of the waste material prior to or following its treatment with the stated economic advantage over the prior art.

The machine can be maneuvered in various directions by use of the steering cylinders 58, 59, 58' and 59'. For instance, if it is desired to transport the machine by flat bed truck or rail car, the machine can be driven up one longitudinal side thereof onto the flat bed to position the axis of the tunnel at substantially right angles to the longitudinal axis of the flat bed. This is accomplished when the machine is in the right hand mode position shown in FIGS. 1 and 11a by first retracting the rod of steering cylinder 59' causing the associated forward traction wheel 31 to rotate counterclockwise so that its path of travel is substantially in alignment with the axis of the tunnel. In one form of the machine, the rods 36 that form the vertical pivot axes for the traction wheels 31 on opposite sides of the machine both lie on a line therethrough that is disposed at approximately 7.5° to a line at right angles to the axis of the tunnel or to the axes of the rotors 22. Retraction of steering cylinder 59' thus rotates its associated traction wheel 31 counterclockwise approximately 52.5°, so the line of travel of wheel 31 is approximately 7.5° relative to the axis of the tunnel. The motor of left hand traction wheel 31 is then actuated to cause the machine to make a right hand turn until the axis of the tunnel is approximately parallel with the desired path of travel of the machine to drive it up the side of the flat bed for loading it thereon. Steering cylinder 59 is then extended which rotates its associated traction wheel 31 counterclockwise, by way of arm 35, about its vertical axis 36, by approximately 52.5° in the example described, or to a position where its path of travel is substantially in alignment with the axis of the tunnel. Operation of the wheel motors 33 for both traction wheels 31 will then cause the machine to move forwardly on a path in substantial alignment with the axis of the tunnel. In the example described, the machine actually moves forwardly on a path approximately 7.5° relative to the axis of the tunnel.

With this description of one steering maneuver of the machine with the steering cylinders, other steering maneuvers using other steering cylinders are believed to be apparent and further explanation is believed unwarranted.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A machine for treating a continuous deep layer of waste material covering a wide area of the ground comprising a tunnel frame, mechanical waste treatment means carried by the tunnel frame, a steering and traction wheel and a cooperative trailing caster wheel disposed on each side of the tunnel frame, independent power drive and steering means for each steering and traction wheel, power means to raise and lower said steering and traction wheels and said caster wheels on each side of the tunnel frame relative to the tunnel frame, additional power means bodily supporting each steering and traction wheel and associated caster wheel at each side of the tunnel frame and being operable to longitudinally shift such wheels forwardly and rearwardly along the sides of the tunnel frame to and from right and left hand use modes on the tunnel frame, said steering and traction wheels in both the right and left hand use modes being positioned to track at an acute angle to the tunnel axis of said frame, and means to releasably lock said additional power means in said right and left hand use modes.

2. A machine as defined in claim 1, and said mechanical waste treatment means comprising spaced parallel treatment rotors extending across the axis of the tunnel defined by said tunnel frame.

3. A machine as defined in claim 1, and said independent power drive and steering means comprising a wheel motor coupled with each steering and traction wheel, a steering arm on each steering and traction wheel, and a pair of back-to-back connected power cylinders having corresponding rod ends coupled to the steering arm and other corresponding rod ends coupled to members rigid with said tunnel frame.

4. A machine as defined in claim 1, and said power means to raise and lower said steering and traction and said caster wheels comprising an upright axis lift cylinder having a piston rod secured to each wheel.

5. A machine as defined in claim 4, and the upright axis lift cylinders being bodily mounted on said additional power means.

6. A machine as defined in claim 1, and said additional power means comprising a parallelogram linkage coupled between opposite sides of the tunnel frame and said steering and traction and associated caster wheels.

7. A machine as defined in claim 6, and said additional power means further comprising a mode change power cylinder connected between each side of the tunnel frame and one part of the adjacent parallelogram linkage, said mode change cylinders being operable to shift said parallelogram linkages horizontally forwardly and rearwardly on said tunnel frame to correspondingly shift said steering and traction wheels while simultaneously turning them about vertical axes of rotation.

8. A machine as defined in claim 6, and cooperative bearing pads on top and bottom parts of the parallelogram linkage and opposing stationary parts of the tunnel frame sides.

9. A machine as defined in claim 1, and said means to releasably lock said last-named means comprising cooperative fixed and rotating locking elements on the sides of the tunnel frame and on said additional power means, and power cylinder means operatively connected with said rotating locking elements to move the same to and from locked and release positions.

10. A machine as defined in claim 1, and said additional power means including a parallelogram linkage carried by each side of said tunnel frame and adapted to be shifted forwardly and rearwardly thereon, a mode change power cylinder coupled between each linkage at one side of the tunnel frame to operate the linkage, a steering arm on each steering and traction wheel for turning such wheel around a vertical turning axis on the parallelogram linkage, and said independent power drive and steering means for each steering and traction wheel including a power cylinder means coupled between said steering arm and a member rigid with the tunnel frame.

11. A machine as defined in claim 1, and an operator's cab mounted on said tunnel frame, and power means connected with said cab to rotate the cab through ninety degrees of rotation about a vertical axis of rotation.

* * * * *